United States Patent [19]

Giustiniani et al.

[11] Patent Number: 5,230,037

[45] Date of Patent: Jul. 20, 1993

[54] PHONETIC HIDDEN MARKOV MODEL SPEECH SYNTHESIZER

[75] Inventors: Massimo Giustiniani; Piero Pierucci, both of Rome, Italy

[73] Assignee: International Business Machines Corporation, Armonk, N.Y.

[21] Appl. No.: 716,022

[22] Filed: Jun. 7, 1991

[30] Foreign Application Priority Data

Oct. 16, 1990 [EP] European Pat. Off. ........ 90119789.7

[51] Int. Cl.[5] .............................................. G10L 9/02
[52] U.S. Cl. ........................................................ 395/2
[58] Field of Search ................................... 381/41–53; 395/2

[56] References Cited

U.S. PATENT DOCUMENTS 4,852,180 7/1989 Levinson ................................. 381/43
4,882,759 11/1989 Bahl et al. ............................... 381/51
5,033,087 7/1991 Bahl et al. ............................... 381/43

OTHER PUBLICATIONS

Falaschi, A. et al., "A Functional Based Phonetic Units Definition for Statistical Speech Recognizers", Eurospeech Proceedings, Paris, France, Sep. 1989, vol. 1, pp. 13–16.

Juang, B. H., "On the Hidden Markov Model and Dynamic Time Warping for Speech Recognition-A Unified View", AT&T Bell Lab. Tech. Journal, vol. 63, No. 7, Sep. 1984, pp. 1213–1243.

Cernuschi-Frias, B. et al., "On the Exact Maximum Likelihood Estimation of Gaussian Autoregressive Processes", IEEE Trans. on Acoustics, Speech, and Signal Proc., vol. 36, No. 6, Jun. 1988, pp. 922–924.

Falaschi, A. et al., "A Finite States Markov Quantizer for Speech Coding", ICASSP Conference Proc., N.M., Jun. 1990, pp. 205–208.

Falaschi, A. et al., "A Hidden Markov Model Approach to Speech Synthesis", Eurospeech Proc. off Paris, France, 1989, pp. 187–190.

Primary Examiner—Michael R. Fleming
Assistant Examiner—Michelle Doerrler
Attorney, Agent, or Firm—Marc D. Schechter

[57] ABSTRACT

A method and a system for synthesizing speech from unrestricted text, based on the principle of associating a written string of text with a sequence of speech features vectors that most probably model the corresponding speech utterance. The synthesizer is based on the interaction between two different Ergodic Hidden Markov Models: an acoustic model reflecting the constraints on the acoustic arrangement of speech, and a phonetic model interfacing phonemic transcription to the speech features representation.

10 Claims, 9 Drawing Sheets

5.A ○ Questo e` un esempio di frase
5.B ○ kwE%to & Un esEmpjo dl frAse
5.C ○ Questo e` un esempio di frase
       3    5 1      6     2  6
5.D ○ kk..kkww..wwEEE..EE%%%..%%%%tttt..tttooo..oo..

FIG.5

| Obs(i) | | Obs(i+1) | | Obs(i+2) | | Obs(i+3) | |
|---|---|---|---|---|---|---|---|
| LBL | Prob | LBL | Prob | LBL | Prob | LBL | Prob |
| L1 | P(1) | L1 | | | | | |
| L2 | P(2) | L2 | | | | | |
| L3 | P(3) | L3 | | | | | |
| ... | ... | ... | | | | | |
| ... | ... | ... | | | | | |
| ... | ... | ... | | | | | |

FIG.6

PHONETIC HIDDEN MARKOV MODEL SPEECH SYNTHESIZER

BACKGROUND OF THE INVENTION

The present invention relates to the field of speech synthesis and concerns a new technique to synthesize speech from unrestricted written text.

Text-to-speech synthesis is usually obtained by computing, for each sentence to be synthesized, an intonation contour and the spectra features sequence that represents the phonetic information to synthesize. Correct spectral representation of speech is a major issue in speech synthesis. The prior art methods stem from two general approaches: concatenation synthesis and synthesis by rules.

Concatenation synthesis is based on a proper representation, usually Linear Prediction Coding (LPC), of prerecorded segments of speech, that are stretched and adjoined together in order to construct the desired synthetic speech.

Synthesis by rules, known also as formant synthesis, provides a spectral description of the steady states for each phoneme. Spectra between two adjacent phonemes are then interpolated on the basis of rules drawn by human phoneticians.

The drawbacks of the prior art are that the first method requires a large set of segments (hundreds or more) that are to be extracted from natural speech and the second method requires a high degree of phonetic knowledge. The above requirements, together with the intrinsic complexity of rules, have limited the dissemination of synthesizers using the above methods. Furthermore, generally a text-to-speech synthesizer is strictly language dependent. In fact, phonetic rules vary from one language to another, as well as the speech segments to be used in concatenation synthesis, so that the complexity of customizing a synthesizer to another language is close to that of designing a completely new synthesizer.

SUMMARY OF THE INVENTION

It is an object of the present invention to provide a new technique to synthesize speech from unrestricted text, based on a statistical approach, that does not require prerecorded segments or explicit rules. The present synthesizer is based on the interaction of two hidden Markov models and requires a phonetically aligned speech data base to train the models.

It is another object of the present invention to provide a speech synthesizer system and a method for generating synthesized speech from unrestricted written text. The present invention requires a phonetic description of the language in which speech is to be synthesized, i.e. a catalog of the phonemes of that language.

Procedures for building such a catalog are well known in the art. For that language, the invention also needs a speech data base of preferably existing words which are phonetically aligned; this means that for each uttered word of the data base its phonetic transcription is available and for each phoneme of the words the rough starting and ending points are identified. A proper size of the data base is of about two thousands words, although different sizes can alternatively be used as well.

The synthesizer according to the invention makes use of a prosodic processor and of two hidden Markov models. A prosodic processor converts the input string of text into a sequence of phonetic observations. Each observation string can be considered as the observations sequence of a hidden Markov model (hereafter referred to as a Phonetic Ergodic Hidden Markov Model (PhEHMM)). The hidden state sequence is then computed. To each state a set of speech features vectors is associated by the use of another hidden Markov model (hereafter referred to as an Acoustic Ergodic Hidden Markov Model (AEHMM)). The speech features vectors are transformed by a synthesis filter to produce the synthetic speech output.

The invention teaches the structure of the PhEHMM and the AEHMM, and the method of their training. The invention achieves the object of providing a method for constructing a speech synthesizer that is largely independent of the particular language in which speech is to be synthesized. Moreover, the preferred speech features vectors can be obtained by fully automatic training with extremely reduced human knowledge and interaction.

BRIEF DESCRIPTION OF THE DRAWING

FIG. 5 is sample of the text processing performed by the phonetic processor.

FIG. 6 is a table of labels and their probabilities for different observations.

DESCRIPTION OF THE PREFERRED EMBODIMENTS

A. Acoustic Ergodic Hidden Markov Model

Figure 1:
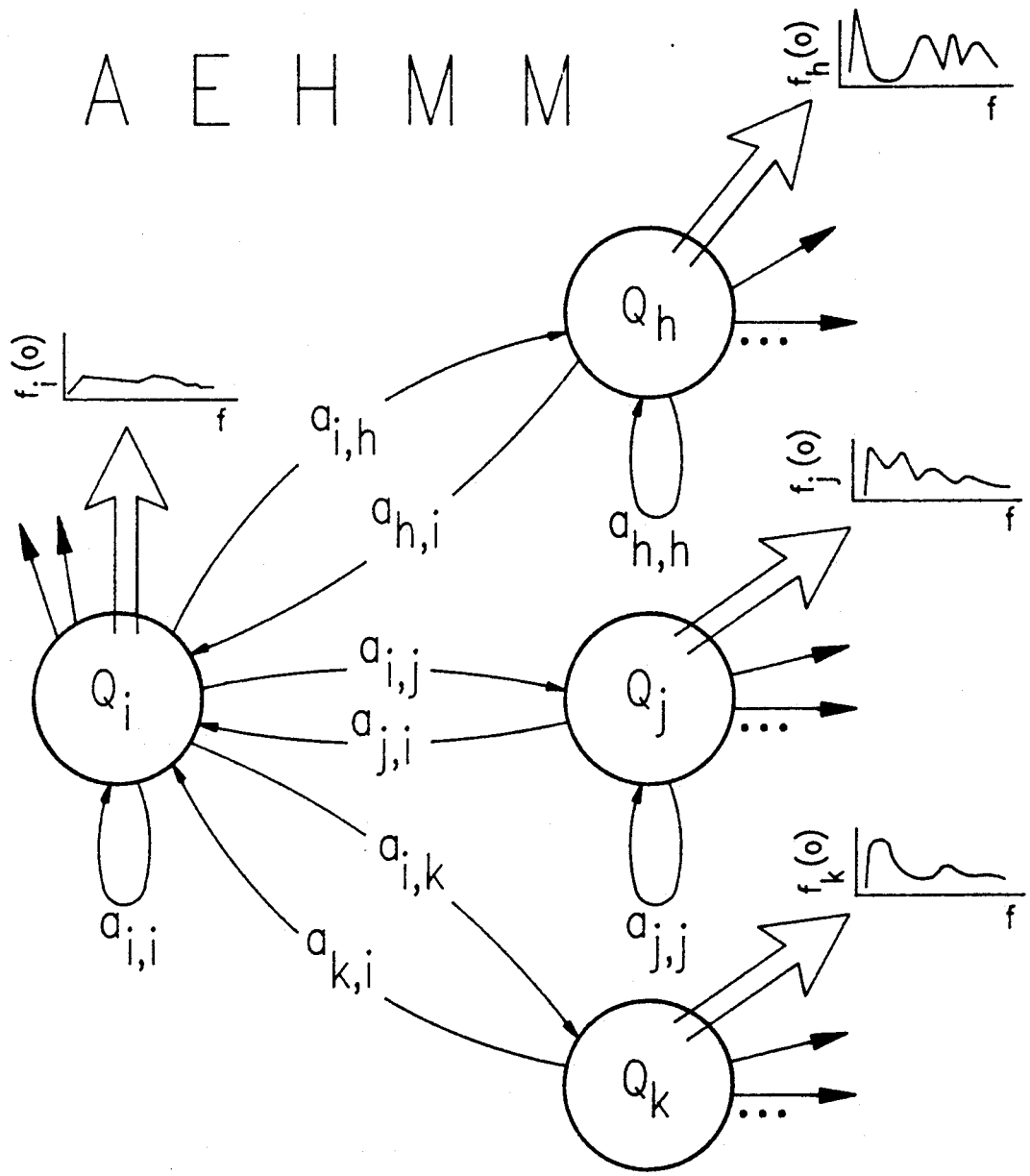
FIG. 1 schematically shows the structure of an AEHMM.

The synthesizer of the present invention is based on the interaction of two different hidden Markov models. The first one is the Acoustic Ergodic Hidden Markov Model (AEHMM), shown in FIG. 1. This figure shows a simplified scheme of the AEHMM, where $Q_h$, $Q_i$, $Q_j$, ... represent the states of the model and $a_{i,j}$ represents the transition probability from state $Q_i$ to state $Q_j$. Near each state $Q_i$ a diagram represents the mean power density spectrum, computed from the expected value of the features vectors output probability density function.

The AEHMM is a fully connected model, since it is possible to move from each state to any other state in one or more steps. It is assumed that the speech signal is represented by a multidimensional space of features. In the described implementation the space is continuous, as it is for the probability distributions. This means that each component of the speech features vectors and distribution values can assume real and continuous, not discrete, values. This approach presents some advantages; however a discrete approach is a possible alternative. Additional parameters, such as a voicing parameter or energy, may be embodied in the set of features or can be determined by external knowledge, according to the identity of the phoneme to be synthesized.

Each state of the AEHMM can be considered as a local model, i.e. a source of features with a continuous probability density distribution to emit a speech features vector (that will also be referred as an observation). In the proposed implementation, the speech spectrum is represented by the first p+1 lags of the autocorrelation function r(j), $1<j<p$, (p=number of autocorrelation lags) and by the linear prediction gain. This means that the speech is modeled by an autoregressive process of order p. The speech is sampled at a proper frequency, for example at 10 kHz, and the resulting quantized speech signal is stored. The speech signal is then divided into slices of the same length, (called frames). The autocorrelation function and LPC are computed for each frame. A suitable value for p is 12, but other values can be used as well.

The AEHMM is described by:

$$\Omega_{AEHMM} = \{M, Q, \Pi, A, F\} \quad (A.1)$$

where M is the size of the model, i.e. the number of model states), Q is the set of states, $\Pi$ is the initial probability vector, A is the state transition matrix, and F is set of observation probability functions. The definition of each model's components follows.

The observation probability functions F are continuous multivariate Gaussian distributions giving, for each state, the probability that a speech event, represented by the parametric vector O, is observed from that state, i.e.:

$$F = \left\{ f_i(O) = Prob(O|q_i) = \frac{1}{2\pi - \frac{N}{2}} \left( \prod_{i=1}^{p} \frac{\beta_i}{\sigma^2} \right) e^{-(\frac{1}{2}\delta(R_{t,i}))} \frac{1}{\sqrt{(2\pi\sigma_{v_i}^2)}} e^{-\frac{(v_t - mv_i)^2}{(2\sigma_{v_i})}} \right\} \quad (A.2)$$

$$1 \leq i \leq M$$

where $$\delta(R_{t,i}) = r^{ai}(O)r^t(O) + 2 \sum_{j=1}^{p} r^{ai}(j)r^t(j) \quad (A.3)$$

and $r^{ai}(j)$ is the j-th lag of autocorrelation vector of state i, $r^t(j)$ is the j-th lag of autocorrelation vector of input speech frame. Moreover $\beta_i$ are the eigenvalues of state autocorrelation matrix and $M_{vi}$ and $\sigma_{vi}$ are the parameters defining the Gaussian voicing probability distribution for state i, which is supposed to be independent from the spectral density. N is a constant value generally proportional to the analysis frame length. This technique is discussed in prior art articles such as "On the Hidden Markov Model and Dynamic Time Warping for Speech Recognition-A Unified View" by B. H. Juang (*AT&T Bell Laboratories Technical Journal*, Vol. 63, No. 7, Sept. 1984) and "On the Exact Maximum Likelihood Estimation of Gaussian Autoregressive Process" by B. Cernuschi-Frias and J. D. Rogers (*IEEE Transactions on Acoustics, Speech, and Signal Processing*, Vol. 36, No. 6, June 1988).

Each state can be considered as a local autoregressive source of signal; the probability of observing a frame of speech of given autocorrelation is given by (A.2); these sources will be referred to below as local sources. The local sources are connected by a transition probability matrix, representing the constraints on the acoustic arrangement of the speech. Given the set of M states $Q = \{q_i\}$, the global model is completely defined by a set of initial probability values $$\Pi = \{\pi_i = Prob(q_i^t = 0)\}, 1 \leq i \leq M \quad (A.4)$$

representing the absolute probability of state $q_i$ at time t=0, and a transition probability matrix $$A = \{a_{i,j} = Prob(q_j^t | q_i^{t-1})\}, 1 \leq i, j \leq M. \quad (A.5)$$

which accounts for the inter-state transition rules, giving the probability of entering state $q_j$ at time t, conditioned on the previous state $q_i$ at time t−1.

Descriptions of the AEHMM are reported in the article "A Finite States Markov Quantizer for Speech Coding" by A. Falaschi, M. Giustiniani and P. Pierucci (*ICASSP Conference Proceedings*, Albuquerque, USA, April 1990), and in the article "A Hidden Markov Model Approach to Speech Synthesis" by A. Falaschi, M. Giustiniani, and M. Verola (*Eurospeech Proceedings*, Paris 1989).

A hidden Markov model represents two stochastic processes, one that is directly observable and one that is hidden. In the AEHMM the observed process is the sequence of features extracted from speech, while the underlying hidden process is the sequence of local sources that most probably have generated the observed speech. This means that the AEHMM associates the features, computed from each speech signal frame, to the state, or set of states, and therefore the corresponding signal sources, that most probably have emitted that signal frame feature. Each source may be represented by a progressive number, also called a label; thus the total number of labels is equal to the size of the AEHMM. This means that the AEHMM associates with each frame the label or labels of each of the sources that most probably emitted the frame feature. This action will be referred as acoustic labelling.

In order to build the model, some kind of distance or distortion measure is to be used. In the present embodiment, a likelihood ratio distortion measure has been preferred, but other kind of measures may alternatively be used. No matter what kind of features representation is used, provided they are useful to represent the spectrum of the signal, the basic point in the use of the AEHMM in the present invention is that of generating for a speech utterance, the sequence of sources, and hence of labels, that most probably have generated the observed speech utterance, where the probability is computed based on the entire utterance and not based merely on a local portion of the utterance such as by using standard vector quantizers. This means that the source identification is not made locally, but considering the whole evolution of the utterance and the constraints on the acoustic arrangement that are embodied in the transition probability matrix.

Initialization and Training of the AEHMM

The AEHMM is initialized by any standard clustering algorithm applied to the same parametric representation of speech used in the AEHMM. In order to reduce the computational requirements of the re-estimation procedure, the model is preferably initialized by a vector quantization clustering scheme (VQ), having the same size as the AEHMM and applied to a set of speech utterances emitted by the same speaker whose speech is used for the AEHMM re-estimation procedure. Vector quantization is known in prior art articles. Initial estimates for the state observation densities can be directly obtained by the speech features vectors of the vector quantizer codebook centroids, while the variance in the proposed features representation is the normalized LPC residual energy. Initial estimates of the state transition probability matrix can be obtained by using the set of VQ quantized speech utterances from the number of occurrences of VQ label $l_i$ and VQ label $l_j$ in sequence, divided by the total number of observed couples starting with VQ label $l_i$, i.e.:

$$A^0 = \left\{ a_{i,j}^0 = \frac{Coc(l_i^{t-1}, l_j^t)}{\sum_{t=1}^{T} \sum_{j=1}^{M} Coc(l_i^{t-1}, l_j^t)} \right\} \quad (A.6)$$

where $Coc(l_i^{t-1}, l_j^t)$ is the co-occurrence of VQ label $l_i$ at time $t-1$ followed by VQ label $l_j$ at time $t$ in the training data. Initial estimates of initial probability vector (A.3) can be computed in the same way as the number of occurrences of VQ label $l_i$ divided by the total number of observed labels, that is:

$$\Pi^0 = \left\{ \pi_i^0 = \frac{Cnt(l_i)}{\sum_{i=1}^{M} Cnt(l_i)} \right\} \quad (A.7)$$

where $Cnt(l_i)$ is the number of occurrences of VQ label $l_i$ in the training data. Training is then performed on a speech corpus by usual Forward-Backward recursion and Baum-Welch re-estimation formulas. In order to reduce the training data size requirements, and to improve the overall estimation procedure, it is preferred that all the speech data be uttered by the same speaker. Moreover, it is preferable that the utterances be phonetically balanced, that is they should be representative of the phonetic events typical of the language and present the phoneme probabilities typical of the considered language.

Use of the AEHMM

The AEHMM is used to perform acoustic labelling on a phonetically aligned speech data base; this means that, for each speech frame, there is a label indicating the selected state in the AEHMM, the speech features vectors associated to the local source corresponding to the selected label and the phonetic transcription, in a suitable phonetic alphabet, of the uttered phoneme from which the speech is extracted. It is preferable that the phonetically aligned speech data base and the training speech data base used to train the AEHMM be uttered by the same speaker. To train an M=256 state model it is preferable to use a speech corpus having the size of two thousand or more phonetically aligned words.

B. Phonetic Ergodic Hidden Markov Model

Figure 2:
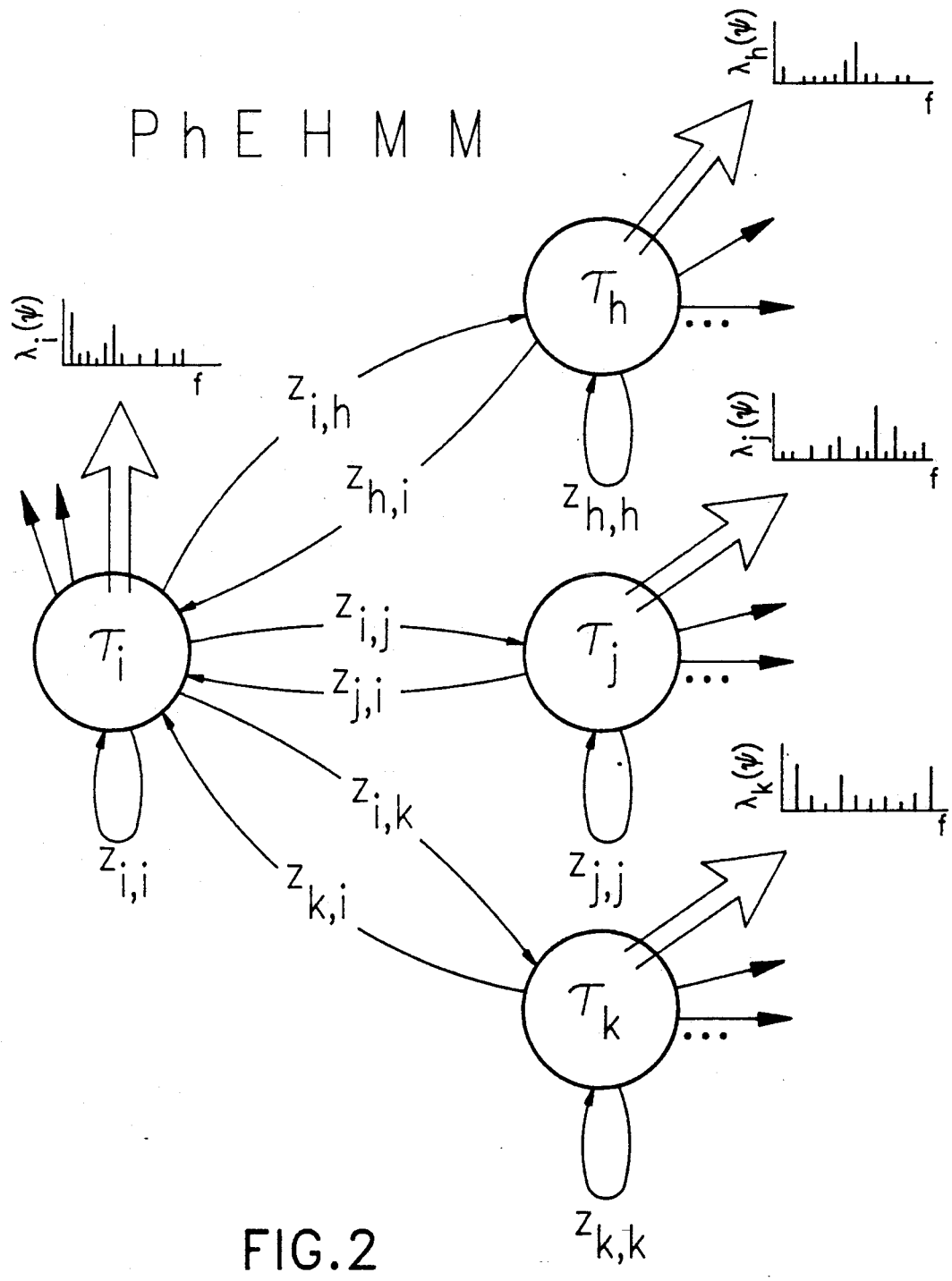
FIG. 2 schematically shows the structure of a PhEHMM.

FIG. 2 shows the second Hidden Markov Model used in the present invention, the Phonetic Ergodic Hidden Markov Model (PhEHMM).

The PhEHMM is a model similar to the previously described AEHMM in that it has the same size (i.e. the same number of states) and it is initialized with the same transition probabilities among the states obtained by the transition probability matrix of the AEHMM. The observation probability functions of the PhEHMM are different from the ones of the AEHMM in that to each state of the PhEHMM is associated an observation probability function of emitting a phoneme of the adopted phonetic alphabet. The sequence of phonemes, each repeated a number of times proportional to their durations in the utterance to be synthesized, are called here synthetic observations.

The role of the PhEHMM is hence that of establishing a correspondence between a string of synthetic observations and the sequence of the phonetic sources that most probably have emitted said synthetic observations. The PhEHMM is hence described by the following formula:

$$\phi_{PhEHMM} = \{M, T, \Theta, Z, \Lambda\} \quad (B.1)$$

where M is the size of the model, i.e. the same as for the AEHMM, T is the set of states, $\Theta$ is the initial probability vector, Z is the state transition probability matrix and $\Lambda$ is a set of observation probability functions.

The observation probability functions $\Lambda$ of each state are discrete, giving for each state the probability that a phonetic symbol $\Psi_i$ is observed from that state:

$$\Lambda = \{\lambda_{i,j} = Prob(\psi_i | \tau_j), 1 \leq i \leq E, 1 \leq j \leq M. \quad (B.2)$$

The observation probability functions are discrete because of the nature of phonetic symbols domain. E is the size of the adopted phonetic alphabet. Given a string of phonetic symbols, the PhEHMM is used to compute the most probable sequence of labels that constitutes the hidden state sequence, and therefore, using the AEHMM, the most probable sequence of spectral features corresponding to the phonetic symbols string.

FIG. 2 shows a simplified scheme of the PhEHMM, where $\tau_i, \tau_j, \tau_k, \ldots$, represent the states of the model, $Z_{i,j}$ represents the transition probability from state $\tau_i$ to state $\tau_j$. Near each state a diagram represents the discrete density probability of emitting each phoneme of the adopted phonetic alphabet.

Initialization and Training of the PhEHMM

The PhEHMM is initialized using the same speech corpus, acoustically and phonetically labelled, previously defined in connection with the AEHMM. Initial estimates for the initial probability vector and transition probability matrix can be obtained by the corresponding stochastic descriptions of the AEHMM, considering as transition probability matrix Z the same transition probability matrix A of the AEHMM. The same is done for the initial probability vector $\Theta$.

$$\Theta^0 = \Pi, \quad Z^0 = A \quad (B.3)$$

The observation distribution function of each state is initialized via the following procedure. The previously defined speech corpus is acoustically labelled using the AEHMM, obtaining the AEHMM state sequence:

$$S_T = \{\tau^0, \tau^1, \ldots \tau^T\} \quad (B.4)$$

A phonetic transcription of the same speech corpus is obtained using a suitable method, obtaining a sequence of phonetic symbols:

$$S_\psi = \{\psi^0, \psi^1, \ldots, \psi^T\} \quad (B.5)$$

The initial estimate of the observation probability function for each state can now be obtained using:

$$\lambda_{i,j} = prob(\psi_i|\tau_j) = \frac{Cnt(\psi_i, \tau_j)}{\sum_{i=1}^{E} Cnt(\psi_i, \tau_j)} \quad (B.6)$$

$$1 \leq i \leq E, 1 \leq j \leq M$$

giving for each state the probability that a phonetic symbol $\Psi_i$, is observed from that state. In this expression $Cnt(\Psi_i, \tau_j)$ is the number of joint observed occurrences of phonetic symbol $\Psi_i$ and state $\tau_j$. The PhEHMM is then iteratively re-estimated by the well-known Baum-Welch algorithm on a suitable phonetically transcribed text corpus.

C. Description of the synthesizer system

Figure 3:
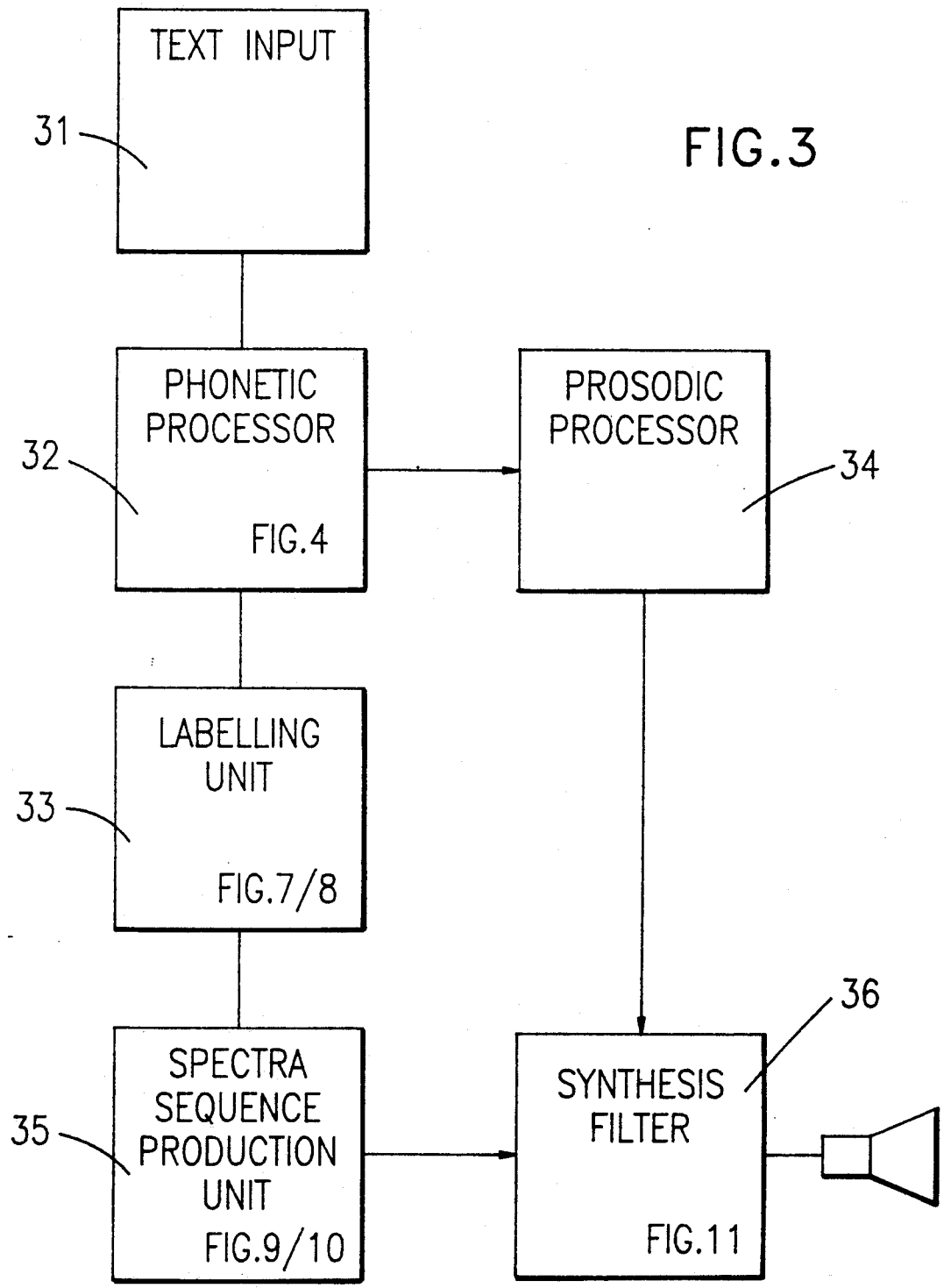
FIG. 3 is a block diagram of a text-to-speech synthesizer according to the present invention.

FIG. 3 illustrates a block diagram of a text-to-speech synthesizer 30. In the diagram only the structures involved in the present invention are fully explained, while the components necessary for the speech synthesis, but which are standard in the art, are only briefly described. Synthesizer 30 includes text input unit 31, phonetic processor 32, prosodic processor 34, labelling unit 33, spectra sequence production unit 35 and synthesis filter 36. Text input unit 31 provides the text input interface and the processing needed to divide the input text into sentences for subsequent processing. Phonetic processor 32 is depicted in more detail in FIG. 4.

Figure 4:
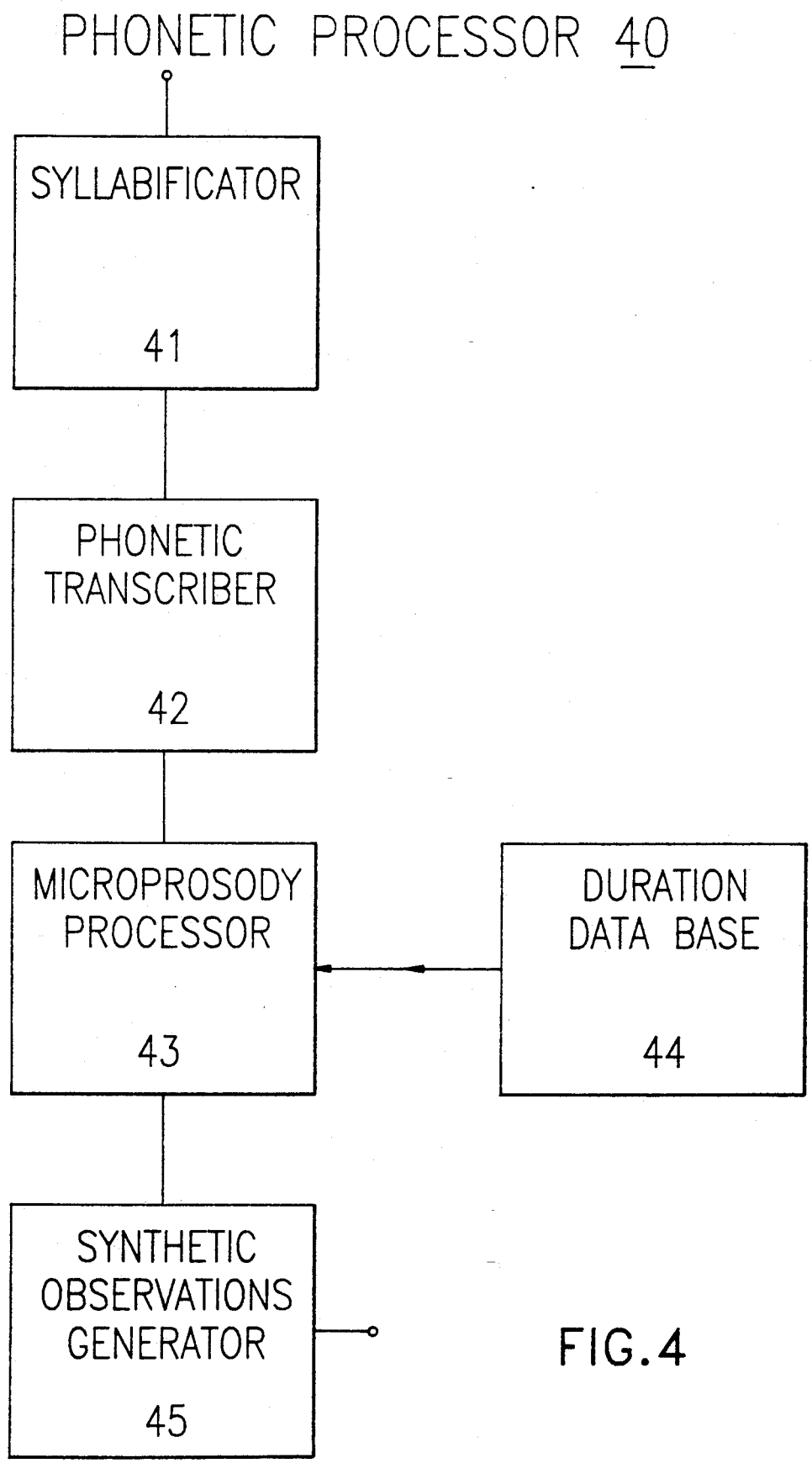
FIG. 4 is a block diagram of the phonetic processor of FIG. 3.

With reference to FIG. 4, syllabificator 41 is a syllabification unit, having the purpose of dividing input text into syllables for the next process. Phonetic transcriber 42 converts input graphemes (e.g. letters) into the corresponding phonemes. A phonetic alphabet of 29 symbols was used in the proposed embodiment, as shown in Table 1. However other phonetic alphabets, which may be more detailed, can alternatively be used if desired.

TABLE 1

| | | | |
|---|---|---|---|
| 1 | 0 | silence | |
| 2 | £ | sc | as in the Italian word scienza |
| 3 | $ | s | as in the Italian word miasma |
| 4 | % | s unvoiced | as in the Italian word posto (po%to) |
| 5 | ii | gn | as in the Italian word ragno (raiiO) |
| 6 | eè | gl | as in the Italian word aglio (aeèo) |
| 7 | a | | |
| 8 | b | | |
| 9 | c | | |
| 10 | d | | |
| 11 | e | | |
| 12 | f | | |
| 13 | g | | |
| 14 | i | | |
| 15 | j | i | as in the Italian word vario (varjo) |
| 16 | l | | |
| 17 | k | ch | as in the Italian word cane (kane) |
| 18 | m | | |
| 19 | n | | |
| 20 | o | | |
| 21 | p | | |
| 22 | r | | |
| 23 | s | | |
| 24 | t | | |
| 25 | u | | |
| 26 | w | u | as in the Italian word continuo (kontinwo) |
| 27 | z | | |
| 28 | oò | ts | as in the Italian word scienza ( enoòa) |
| 29 | aà | g | as in the Italian word contingente (kontinaàente) |

Microprosody processor 43 computes the overall duration for each phoneme to be synthesized. It makes use of a syllable model and morphosyntactical information in order to produce the desired output. It is based on a concept of intrinsic duration of the phoneme. Each phoneme is considered differently according to its position in the syllables and respect to the lexical stress. To each different phoneme position a different duration value, stored in duration data base 44, is associated. Syllable models of this kind have been proposed in literature. Intrinsic durations are then stretched accordingly to the part-of-speech of the word in the sentence. Algorithms to modify durations accordingly to the part-of-speech are reported in prior art.

Synthetic observations generator 45 has the role of converting the sequence of phonemes and corresponding overall durations into a string of PhEHMM synthetic observations. Generator 45 produces a string of phonemes, where each phoneme is repeated as many times as the number of frames corresponding to its overall computed duration.

Referring to FIG. 5, a sample of the input string text is shown on line 5.A where the Italian sentence "Questo èun esempio di frase"
is used as an example of text to be synthesized. Line 5.B shows the phonetic transcription of the sentence used in that example. In line 5.C the sequence of words and the corresponding parts-of-speech are reported. Line 5.D shows each phoneme repeated as many times as the number of frames corresponding to its overall computed duration.

Labelling unit (LU) 33 of FIG. 3 has the purpose of computing the most probable state sequence, corresponding to the synthetic observations sequence. Labelling unit 33 is shown in two different implementations, LU 70 and LU 80 in FIG. 7 and FIG. 8, respectively.

Figure 7:
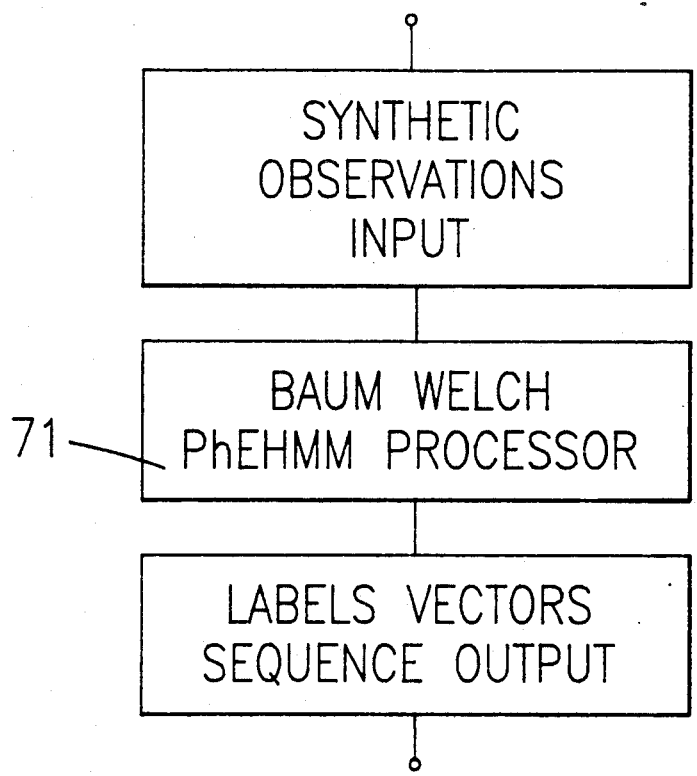
FIG. 7 is a block diagram of a proposed implementation of the labelling unit of FIG. 3.

Labelling unit 70 of FIG. 7 computes from the synthetic observations sequence, as the one reported in line 5.D of FIG. 5, the underlying sequence of states of the PhEHMM. Baum-Welch PhEHMM processor 71 performs the well-known Baum-Welch algorithm. Processor 71 has the purpose of generating for each observed phoneme the probability vector of each state which caused that phonetic symbol observation, as shown in FIG. 6. Each element in the array of FIG. 6 is composed of a label (L1, L2, L3 . . . ), and a label probability (P(1), P(2), P(3) . . . ) for each observation, where an observation is, as specified above, a phonetic symbol of the synthetic observations sequence. For each column of the table, LBL represents the label of the state of the PhEHMM, and Prob is the probability of the label to have generated the observation.

Figure 8:
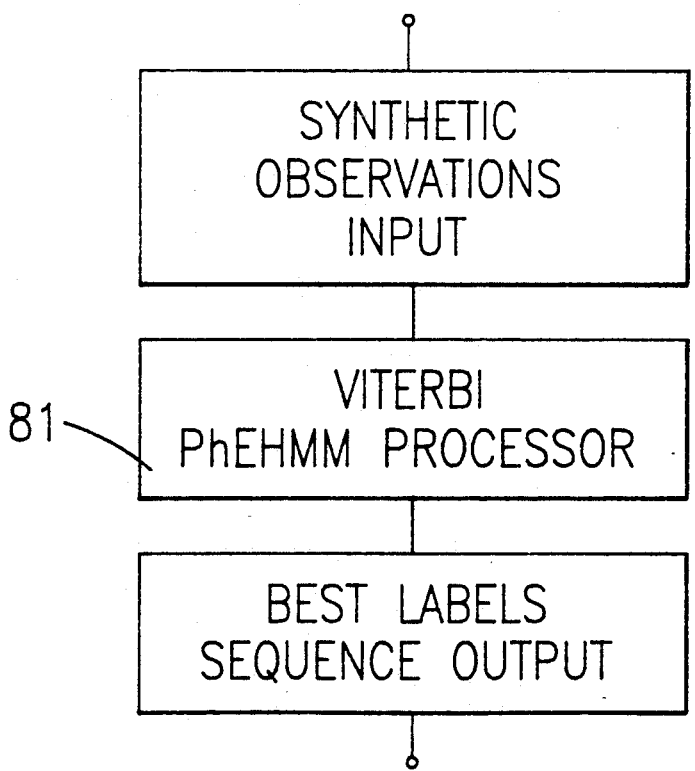
FIG. 8 is a block diagram of another proposed implementation of the labelling unit of FIG. 3.

FIG. 8 shows the second implementation of labelling unit (LU) 33 of FIG. 3 as LU 80. It computes from the synthetic observations sequence the best sequence of the states of the PhEHMM using any optimality criterion. Only one state (i.e. one label) is associated with each item of the synthetic sequence observations. As an example, the state sequence can be computed by the well-known Viterbi algorithm performed by Viterbi PhEHMM processor 81 on the whole synthetic observations sequence.

Figure 9:
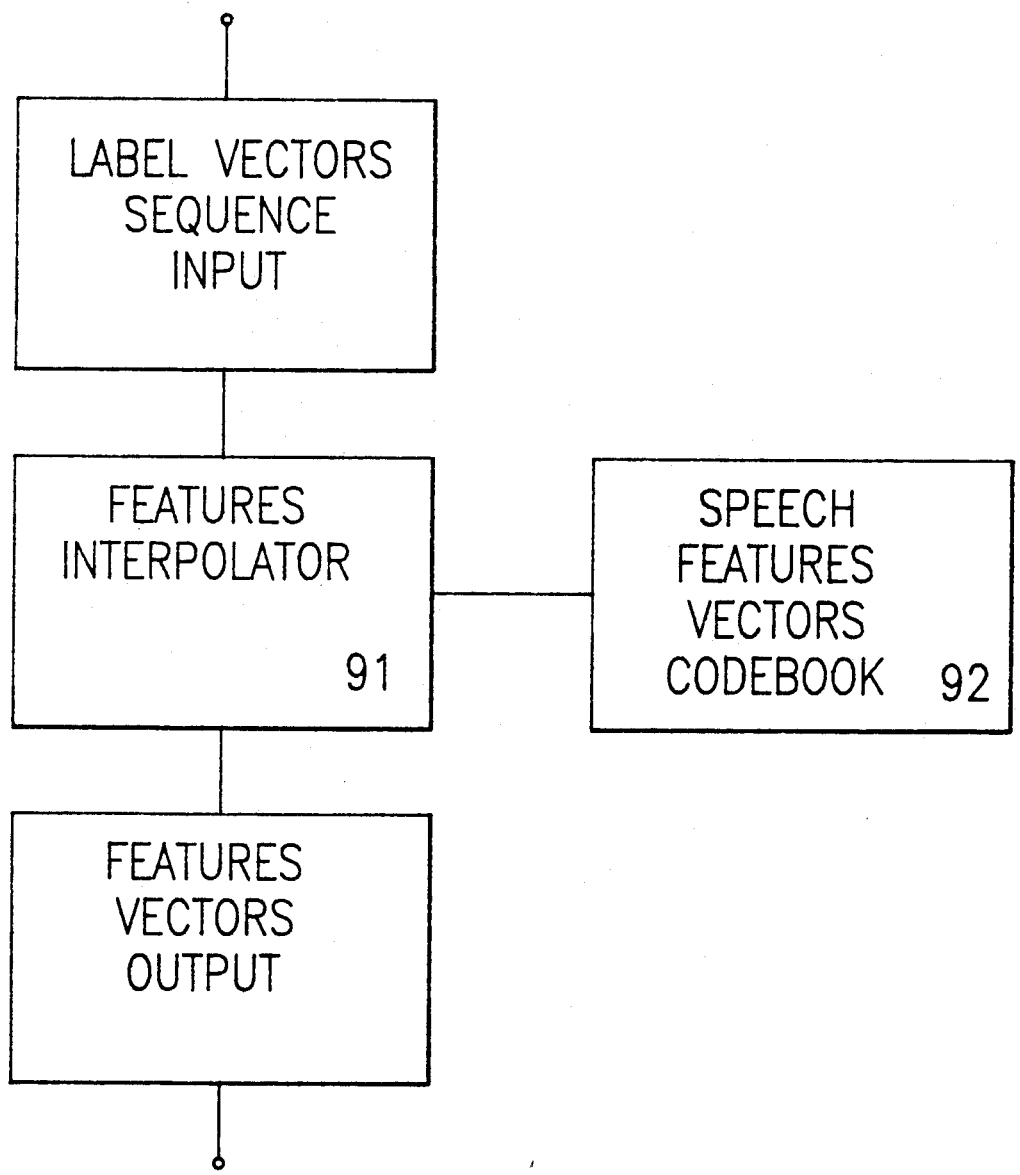
FIG. 9 is a block diagram of the spectral sequence production unit used with the labelling unit of FIG. 7.
Figure 10:
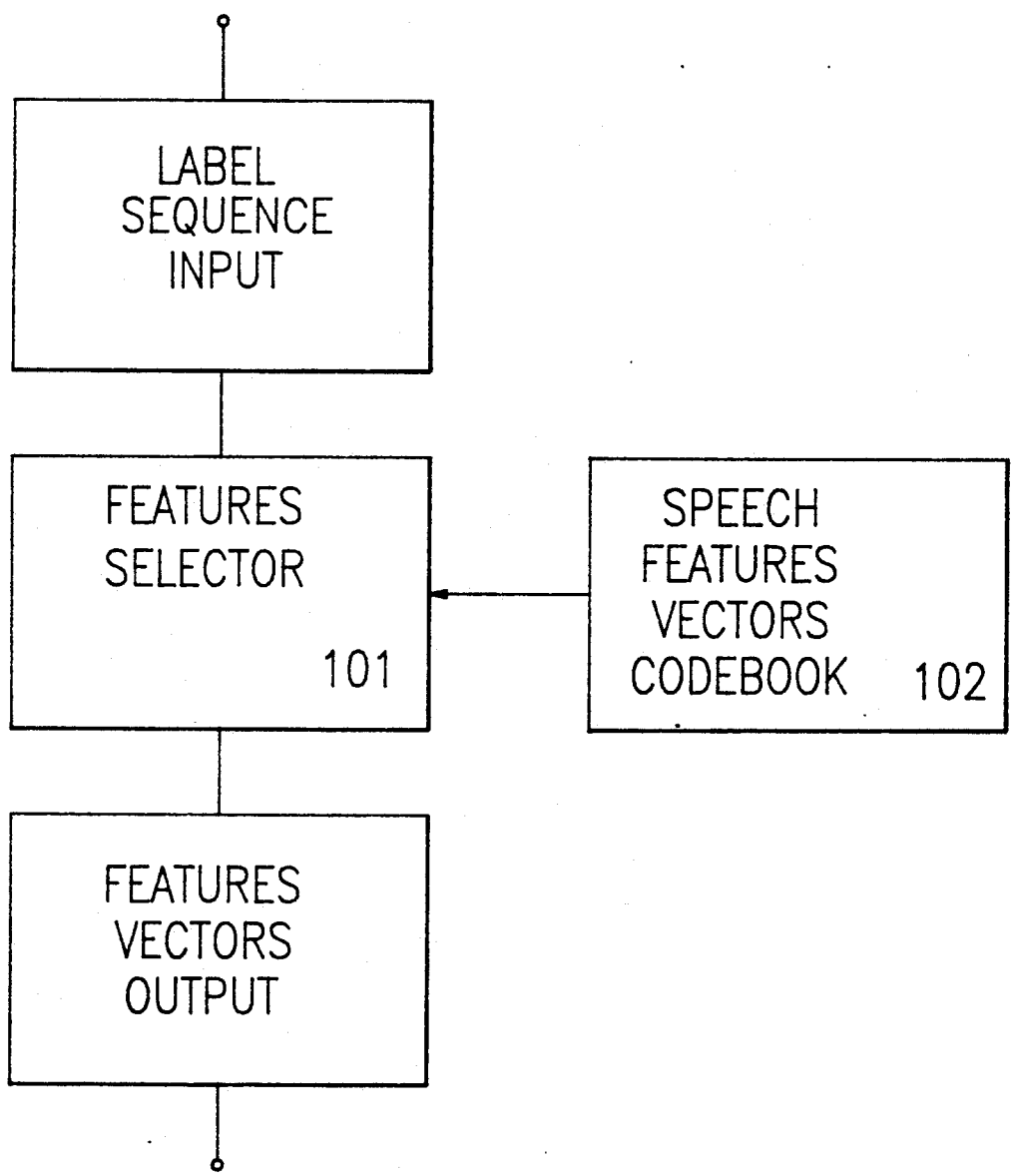
FIG. 10 is a block diagram of the spectral sequence production unit used with the labelling unit of FIG. 8.

The spectra sequence production unit (SSPU) of FIG. 3 has the purpose of converting the input labels sequence, as generated by labelling unit 70 or 80, into a sequence of filter coefficients. FIGS. 9 and 10 show the structure of SSPU 90 and 100 corresponding to the two implementations of labelling unit 70 and 80 respectively. SSPU 90 comprises speech features codebook (SFC) 92 and the features interpolator (FI) 91. SFC 92 associates with each label a corresponding source model of the AEHMM, as determined by the previous AEHMM training. This means that in the present embodiment a vector of the expected values of the source parameters is associated with each label produced by labelling unit 70. This is obtained using multivariate Gaussian distributions. In such case, the mean value of the Gaussian density distribution itself is associated with each label.

Features interpolator 91 provides the computing to generate the actual features vector to be used in the synthesis filter. For this purpose, features interpolator 91 computes a weighted mean of the speech features vectors of the AEHMM codebook. It is of course desirable that the features be linear with respect to the interpolation scheme. When prediction coefficients are used, it is preferable to transform them into more linear features as, for instance, log area ratios. The features vectors transformation operation is indicated by $\Gamma(r_i)$, and gives a different set of features vectors $u_i$:

$$U = \{u_i = \Gamma(r_i)\}, 1 \leq i \leq M \tag{C.1}$$

The output features vector, for each frame to be synthesized, is then computed by weighting the features vectors of the codebook by the probabilities of the corresponding labels at time t, as here reported:

$$u_{av}^t = \sum_{i=1}^{M} u_i \times prob(\tau_i^t) \tag{C.2}$$

where $prob(\tau_i^t)$ are the probabilities of each state as computed by labelling unit 70, and $u_i$ are the transformations of the associated features vectors of the codebook, and $u_{av}^t$ is the resulting features vector to be sent to the synthesis filter. The result is then back converted into a spectral representation suitable for the synthesis process. In the proposed implementation, reflection coefficients k are used, back transformed as in C.3

$$K = \{k_i = \Delta(u_i)\}, 1 \leq i \leq M \tag{C.3}$$

where $\Delta$ is the back transformation operator.

Spectra sequence production unit 100 suitable for LU 80 is shown in FIG. 10 and comprises spectral features codebook 102 and features selector 101. In this implementation, features selector 101 associates with each label the corresponding speech features vectors of the AEHMM, stored in speech features vectors codebook 102, selected according to the optimum algorithm.

Resulting speech features vectors are then transformed into filter coefficients to be used by synthesis filter 36. When the reflection coefficients k are used, the synthesis filter assumes the structure shown in FIG. 11.

Figure 11:
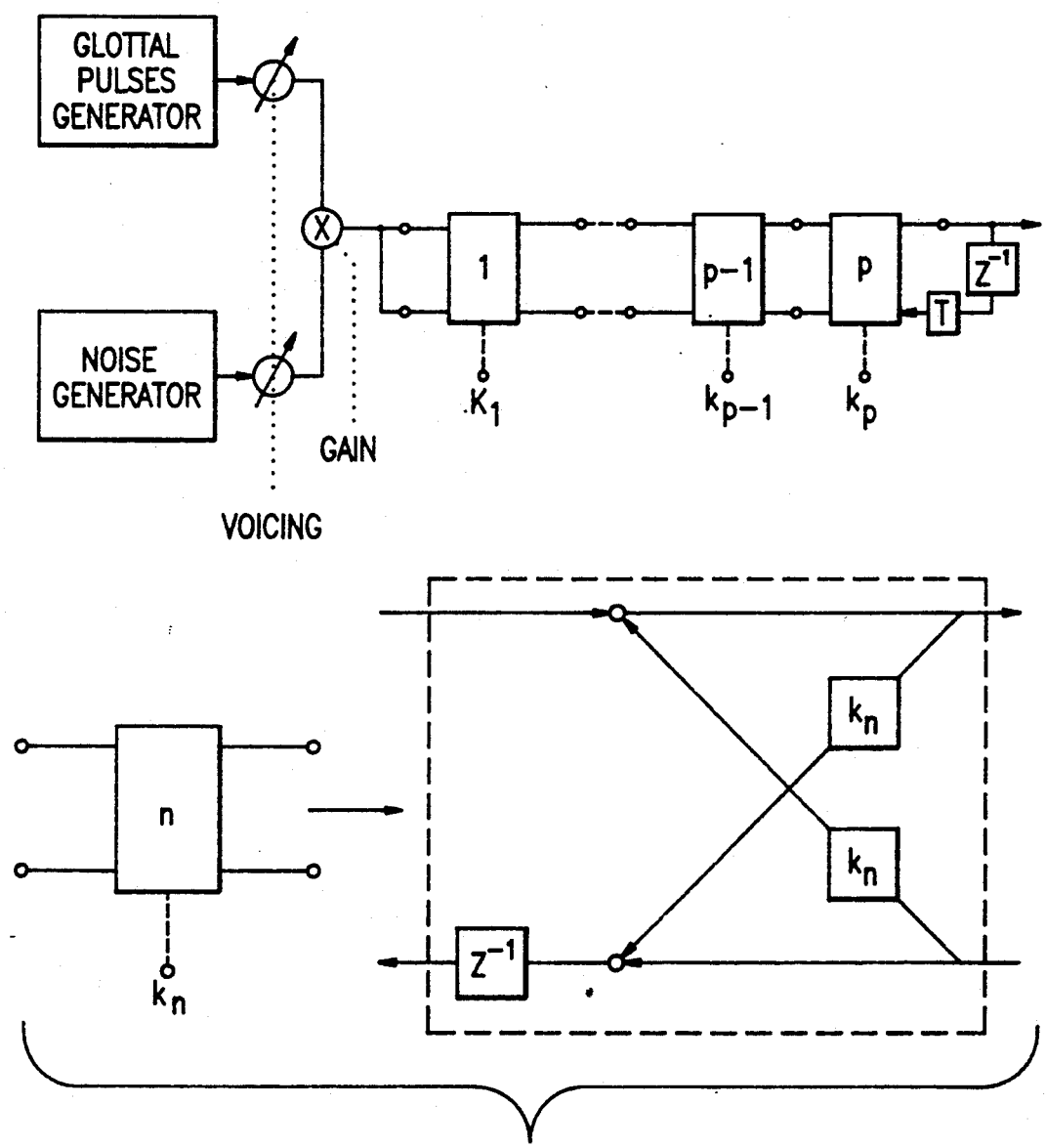
FIG. 11 is a structure of the lattice Synthesis Filter used in the proposed implementation.

In FIG. 11, gain values are provided by the energy contour, computed by prosody processor 34.

Other procedures to compute energy may be used as well. The excitation sources, glottal pulses generator and noise generator, in FIG. 11 are controlled by the voicing parameter. Voicing can be computed in different ways: if it is imbedded in the spectral features set, it is processed in the same way as the other features. A threshold decision may be used in order to classify the speech frame as voiced or unvoiced, or mixed excitations may be used as well. Otherwise, voicing parameter should be associated with each phoneme to be synthesized, and changed in the synthesis process accordingly to the actually synthesized phoneme.

D. Operation of the Synthesizer

Once the two hidden Markov models, AEHMM and PhEHMM, have been built as described in Section A and B, the text-to-speech synthesis process shown in FIG. 3 can be summarized as follows:

The written text is inputted through text input 31, and is then converted into a phonetic transcription by phonetic processor 32. Phonetic processor 32 also determines the additional parameters that may be used in synthesis filter 36.

Microprosody processor 43 (FIG. 4) of phonetic processor 32/40 computes the overall duration for each A different duration is assigned to each phoneme by duration data base 44 (FIG. 4).

The phoneme sequence and the durations associated with each phoneme are processed by synthetic observations generator 45 (FIG. 4), which produces the synthetic observations sequence, a sample of which is shown in line 5.D of FIG. 5.

The synthetic observations sequence is then processed by labelling unit 33, which computes, according to a selected optimality criterion, the labels sequence (i.e. the sequence of states of the PhEHMM) corresponding to the synthetic observations sequence.

Spectra sequence production unit 35 accepts as input the labels sequence and associates with the labels the speech features vectors of the corresponding AEHMM.

The resulting speech features vectors are then transformed into filter coefficients. These coefficients, together with the prosodic and additional parameters generated by prosodic processor 34, are then used by synthesis filter 36 to produce the synthetic speech output.

We claim:

1. A method for generating synthesized speech wherein an acoustic ergodic hidden Markov model (AEHMM) reflecting constraints on the acoustic arrangement of speech is correlated to a phonetic ergodic hidden Markov model (PhEHMM), the method comprising the steps of
   a) building an AEHMM in which an observations sequence comprises speech features vectors extracted from frames in which the speech uttered during the training of said AEHMM is divided, and in which a hidden sequence comprises a sequence of sources that most probably emitted the speech utterance frames;
   b) initializing said AEHMM by a vector quantization clustering scheme having the same size as said AEHMM;

c) training said AEHMM by the Forward-Backward algorithm and Baum-Welch re-estimation formulas;

d) associating with each frame a label representing a most probable source;

e) building a PhEHMM of the same size as said AEHMM in which an observations sequence comprises phoneme sequence obtained from a written text, and in which a hidden sequence comprises a sequence of labels;

f) initializing a PhEHMM transition probability matrix by assigning to state transition probabilities the same values as the transition probabilities of the corresponding states of said AEHMM;

g) initializing PhEHMM observation probability functions by:
  (g.1) using a speech corpus aligned with a sequence of phonemes,
  (g.2) generating for said speech corpus a sequence of most probable labels, using said AEHMM, and
  (g.3) computing the observations probability function for each phoneme, counting the number of occurrences of the phoneme in a state divided by the total number of phonemes emitted by said state;

h) training said PhEHMM by the Baum-Welch algorithm on a proper synthetic observations corpus;

h.1) providing an input text of one or more words to be synthesized;

i) determining for each word to be synthesized a phoneme sequence and through said PhEHMM a sequence of labels corresponding to the word to be synthesized by means of a proper optimality criterion;

j) determining from the input text a set of additional parameters, as energy, prosody contours and voicing, by a prosodic processor;

k) determining, for the sequence of labels corresponding to the word to be synthesized, a set of speech features vectors corresponding to the word to be synthesized through said AEHMM;

l) transforming said speech features vectors corresponding to the word to be synthesized into a set of filter coefficients representing spectral information; and m) using said set of filter coefficients and said additional parameters in a synthesis filter to produce a synthetic speech output.

2. A method for generating speech from unrestricted written text according to claim 1, wherein the proper optimality criterion of step i) is given by the Baum-Welch algorithm, and wherein the determination of the speech features vectors of step k) is obtained by weighting the features vectors by the probabilities of corresponding labels.

3. A method for generating speech from unrestricted written text according to claim 1, wherein the proper optimality criterion of step i) is given by the Viterbi algorithm, and wherein the determination of the speech features vectors of step k) is obtained by associated with each label, in the sequence of labels corresponding to the word to be synthesized, the corresponding speech features vector of said AEHMM.

4. A text-to-speech synthesizer system comprising:
a text input device for entering text of speech to be synthesized;

a phonetic processor for converting the text input into a phonetic representation and for determining phonetic duration parameters;

a prosodic processor for generating prosodic and energy contours for the speech to be synthesized; and a synthesis filter which, using said prosodic and energy contours and filter coefficients, generates the speech to be synthesized;

characterized in that:

said phonetic processor includes a synthetic observations generator which translates said phonetic representation of the input text into a string of phonetic symbols, each phonetic symbol repeated to properly reflect the phoneme duration, and said phonetic processor generates a Phonetic Ergodic Hidden Markov Model (PhEHMM) observation sequence; and the system further comprises:

a labelling unit associating with each observation of said observations sequence the probability that a state of the PhEHMM has generated said observation by an optimality criterion; and a spectra sequence production unit computing a speech features vector for each speech frame to be synthesized by a correlation between labels and speech features vectors, computed by an Acoustic Ergodic Hidden Markov Model (AEHMM), built on previously uttered speech corpus, said spectra sequence production unit converting by a back transformation the speech features vectors into filter coefficients to be used by said synthesis filter.

5. A text-to-speech synthesizer system of claim 4 in which the optimality criterion used in said labelling unit consists of computing the probability that each state generated a given observation by the Baum-Welch algorithm, and in which each speech features vector is computed by said AEHMM as a sum of the speech features vectors associated with each state of the PhEHMM, weighted by the probability that the state of the PhEHMM generated the observation, computed by said labelling unit.

6. A text-to-speech synthesizer system of claim 4 wherein the optimality criterion used in said labelling unit consists of computing the sequence of the states that most probably have generated the observed synthetic observations sequence as obtained by the Viterbi algorithm, and wherein each speech features vector is obtained by associating with each state of the PhEHMM the corresponding source model of said AEHMM and a speech features vector comprising a mean vector associated with the source model.

7. A method of generating synthesized speech, said method comprising the steps of:

generating a set of acoustic hidden Markov models, each acoustic hidden Markov model comprising a plurality of states, transitions between the states, a set of acoustic features vectors outputs associated with the states or transitions, and probabilities of the transitions and of the outputs;

generating a set of phonetic hidden Markov models, each phonetic hidden Markov model comprising a plurality of states, transitions between the states, a set of phonetic symbol outputs associated with the states or transitions, and probabilities of the transitions and of the outputs, each phonetic hidden Markov model being correlated with exactly one acoustic hidden Markov model;

converting a text of words into a series of phonetic symbols;

estimating, for each phonetic symbol in the series of phonetic symbols and for each phonetic hidden Markov model, the probability that the phonetic hidden Markov model would generate the phonetic symbol;

generating, for each phonetic symbol in the series of phonetic symbols, at least one acoustic features vector comprising a weighted sum of acoustic features vectors expected to be output by the acoustic hidden Markov models, each expected acoustic features vector being weighted by the probability that the phonetic hidden Markov model correlated with the acoustic hidden Markov model would generate the phonetic symbol; and producing synthetic speech from the generated acoustic features vectors.

8. A method as claimed in claim 7, characterized in that the step of estimating, for each phonetic symbol in the series of phonetic symbols and for each phonetic Markov model, the probability that the phonetic Markov model would generate the phonetic symbol comprises:

estimating, for each phonetic symbol in the series of phonetic symbols and for each phonetic Markov model, the phonetic Markov model which would most likely generate the phonetic symbol;

estimating the probability that the most likely phonetic Markov model would generate the phonetic symbol as one; and estimating the probability that each other phonetic Markov model would generate the phonetic symbol as zero.

9. A text-to-speech synthesizer comprising:

means for storing a set of acoustic hidden Markov models, each acoustic hidden Markov model comprising a plurality of states, transitions between the states, a set of acoustic features vectors outputs associated with the states or transitions, and probabilities of the transistions and of the outputs;

means for storing a set of phonetic hidden Markov models, each phonetic hidden Markov model comprising a plurality of states, transitions between the states, a set of phonetic symbol outputs associated with the states or transitions, and probabilities of the transitions and of the outputs, each phonetic hidden Markov model being correlated with exactly one acoustic hidden Markov model;

a text input device for entering a text of words;

a phonetic processor for converting the text of words into a series of phonetic symbols;

a labeling unit for estimating, for each phonetic symbol in the series of phonetic symbols and for each phonetic hidden Markov model, the probability that the phonetic hidden Markov model would generate the phonetic symbol;

a spectra sequence production unit for generating, for each phonetic symbol in the series of phonetic symbols, at least one acoustic features vector comprising a weighted sum of acoustic features vectors expected to be output by the acoustic hidden Markov models, each expected acoustic features vector being weighted by the probability that the phonetic hidden Markov model correlated with the acoustic hidden Markov model would generate the phonetic symbol; and a synthesis filter for producing synthetic speech from the generated acoustic features vectors.

10. A system as claimed in claim 9, characterized in that the labeling unit comprises a Viterbi processor for estimating, for each phonetic symbol in the series of phonetic symbols and for each phonetic Markov model, the phonetic Markov model which would most likely generate the phonetic symbol, for estimating the probability that the most likely phonetic Markov model would generate the phonetic symbol as one, and for estimating the probability that each other phonetic Markov model would generate the phonetic symbol as zero.

* * * * *